United States Patent [19]

Jones

[11] 4,401,369
[45] Aug. 30, 1983

[54] CLASS OF DICHROIC DYES FOR USE WITH LIQUID CRYSTALS

[75] Inventor: Derick Jones, Doylestown, Pa.

[73] Assignee: Electronic Display Systems, Inc., Hatfield, Pa.

[21] Appl. No.: 312,678

[22] Filed: Oct. 19, 1981

[51] Int. Cl.$^3$ .......................... C09K 3/34; G02F 1/13; C09B 31/30; C09B 33/18; C09B 35/50
[52] U.S. Cl. ................................. 350/349; 252/299.1; 260/166
[58] Field of Search ..................... 252/299.1; 350/349; 260/166

[56] References Cited

U.S. PATENT DOCUMENTS

| | | | |
|---|---|---|---|
| 4,122,027 | 10/1978 | Cole, Jr. et al. | 252/299.1 |
| 4,128,497 | 12/1978 | Cole, Jr. et al. | 252/299.1 |
| 4,137,193 | 1/1979 | Osman et al. | 252/299.1 |
| 4,145,114 | 3/1979 | Coates et al. | 252/299.1 |
| 4,273,929 | 6/1981 | Boller et al. | 252/299.1 |
| 4,308,161 | 12/1981 | Aftergut et al. | 252/299.1 |
| 4,308,162 | 12/1981 | Cole, Jr. et al. | 252/299.1 |
| 4,308,163 | 12/1981 | Aftergut et al. | 252/299.1 |
| 4,308,164 | 12/1981 | Aftergut et al. | 252/299.1 |
| 4,350,603 | 9/1982 | Aftergut et al. | 252/299.1 |
| 4,359,398 | 11/1982 | Cole, Jr. et al. | 252/299.1 |

FOREIGN PATENT DOCUMENTS 2090274 7/1982 United Kingdom ............. 252/299.1

OTHER PUBLICATIONS

Hubbard, R. L., "The Analysis of Liquid Crystal Mixtures", The Physics and Chemistry of Liquid Crystal Devices, Sprokel, G. J. Plenum Press, New York, pp. 331-344, (1980).
White, D. L. et al., J. Appl. Phys., vol. 45, No. 11, pp. 4718-4723, (11/11/74).
Cognard, J. et al., Mol. Cryst. Liq. Cryst., vol. 68, pp. 207-229, (1981).
Jones, F. et al., Mol. Cryst. Liq. Cryst., vol. 60, pp. 99-110, (1980).
Cox, R. J., Mol. Cryst. Liq. Cryst., vol. 55, pp. 1-32, (1979).
Bloom, A. et al., Mol. Cryst. Liq. Cryst., vol. 40, pp. 213-221, (1977).
Bloom, A. et al., Mol. Cryst. Liq. Cryst., vol. 41, (Letters), pp. 1-4, (1977).

Primary Examiner—Teddy S. Gron
Attorney, Agent, or Firm—Scully, Scott, Murphy & Presser

[57] ABSTRACT

A cholesteric guest-host liquid crystal composition having a positive dielectric anisotropy and consisting of a positive nematic host component, an optically active cholesteric component, and a tetra-azo dichroic dye guest component having a dichroic ratio of at least 0.72. The tetra-azo dye is selected from the group consisting of

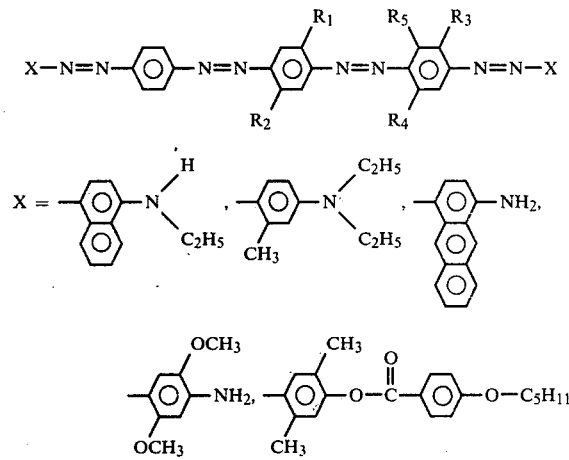

$R_1 = -OCH_3, H$
$R_2 = -CH_3, H$
$R_3 = -OCH_3, H$
$R_4 = -CH_3, H$
$R_5 = -CH_3, H$ 19 Claims, 4 Drawing Figures

CLASS OF DICHROIC DYES FOR USE WITH LIQUID CRYSTALS

BACKGROUND OF THE INVENTION

The present invention is a new type of dye for use with liquid crystal materials, which provides visible displays having enhanced optical and performance characteristics.

Liquid crystals may be defined as that class of matter which has an intermediate or mesomorphic state in which these substances behave mechanically as liquids yet exhibit many optical properties of crystals. The mesomorphic state or liquid crystalline phase is obtained either by heating liquid crystals that are in the solid phase or by cooling liquid crystals that in the liquid phase. Liquid crystal substances may exist in one of the cholesteric, smectic or nematic state. The cholesteric state is distinguished from the nematic state by its markedly different optical properties. For example, cholesteric materials are optically negative whereas nematic materials are optically positive. Optically positive liquid crystals transmit light more slowly perpendicular to the layers of molecules than parallel to them. Nematic liquid crystals orient a beam of ordinary light into two polarized components whose transverse vibrations are at right angles to each other. However, application of force field, such as an electronic field, lines the molecules up, changing their optical properties.

It has been said that the most popular liquid crystal display devices are of the "twisted" nematic type due to their low voltage and current requirements. Twisted nematic type liquid crystal devices, however, exhibit several shortcomings in use, such as reduced brightness in the reflective mode, restricted viewing angle, increased costs, and low adaptibility to multi-color displays, because of the need for polarizers to produce a contrast display system.

In order to overcome these problems liquid crystal "guest-host" display devices have been developed which eliminate the need for polarizers. The term "host" refers to the liquid crystal material, and the term "guest" refers to an agent which may be aligned by the host to produce contrasting light absorptive states in response to selectively activeable external stimuli. For example, U.S. Pat. No. 3,833,287 to Taylor, et al. discloses a host nematic liquid crystal used in conjunction with a pleochroic guest material which in mixture corresponds to the helical molecular orderings of the nematic liquid crystal material. In the helical ordering the guest material is absorptive of incident light, whereas the guest material is nonabsorptive of light when aligned by the nematic crystals under the influence of an applied electric field. Accordingly, when an electric field is applied to a thin layer of the mixture in the display device, incident light passes through the mixture and is reflected off the backing thus exhibiting the color of the backing.

In recent years refinement of effective guest-host systems have been developed using dichroic dyes. Dichroism is the property whereby an oriented assembly of dye molecules exhibit relatively low absorption of a given wavelength of light in one state of orientation and a relatively high absorption of the same wavelength in another state of orientation with respect to the light source. The orientation can be brought about by dissolution of the dye in a liquid crystal solvent or by embedding the dye in a stretched plastic.

In order to achieve sufficient contrast and the high brightness required for colored and multi-colored display systems, dichroic dyes must be used which have good solubility and high order parameter.

Solubility must be sufficiently high so that thin layers, for example, of twelve micrometers, have adequate light absorption in one of the oriented states. Ionic dyes will generally be inadequate not only because of their low solubility but also because they increase the electrical conductivity of liquid crystals.

Order parameter is a quantitative measure of the degree of molecular order of alignment in a given system. The contrast and brightness are both related to the order parameter S of the dye, where $S=(R-1)/(R+2)$ and R is the ratio of the light absorption in the dye measured with a polarizer respectively parallel and perpendicular to the nematic direction of the liquid crystal host at the wavelength of maximum absorption. High order parameter is promoted by dyes with elongated shape having a large ratio of molecular length to breadth, similar to the shape of the molecules of liquid crystal host material. To insure an elongated shape, the molecules should have a rigid structure which can be obtained, for example, by linking benzene or heterocyclic rings with double bonded groups.

Efforts to provide a dye capable of the abovedescribed performance characteristics have resulted in developments disclosed in a series of patents of Cole Jr., et al., assigned to General Electric Company, in which a number of dichroic liquid crystal systems are shown. In U.S. Pat. No. 4,122,027 of Cole Jr., et al. a tris-azo dichroic dye is described having an order parameter S of 0.70 which has the following general formula

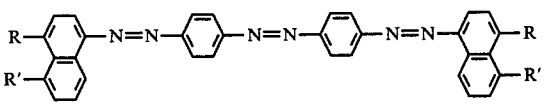

wherein R is $NHCH_3$, $NHC_2H_5$, $NH_2$ or together with R' is

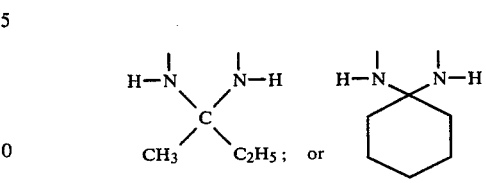

U.S. Pat. No. 4,179,395 of Cole Jr., et al. discloses a dichroic liquid crystal composition which includes a pentazo dichroic dye having an order parameter S of at least 0.65, and U.S. Pat. No. 4,128,497 of Cole Jr., et al., again shows tris-azo compounds useful in liquid crystal display systems because of their high order parameter and contrast characteristics.

Other disclosures in the field of utilization of dyes in conjunction with liquid crystal display systems include U.S. Pat. No. 4,137,193 to Osman, et al. and U.S. Pat. No. 4,145,114 to Coates, et al. Osman et al. describe an azo dye guest component having an order parameter of at least 0.65 and an absorption maximum in the range of from 350 to 700 nanometers. The compounds shown in the Osman, et al. '193 disclosure include only one or at most two azo groups. Coates, et al. show pleochroic dye compounds suitable for use in solution with liquid crystal material which may include from one to nine azo groups.

In all the disclosures described above, the desired effect of the technical development is centered on creating a liquid crystal display system having good contrast and high order parameter as well creation of dyes with good solubility for ease of operation. In furtherance of liquid crystal display technology the present invention provides a new family of dichroic dyes having good contrast, high order parameter, and very high stability to ultraviolet/visible light.

SUMMARY OF THE INVENTION

By the present invention an improvement is provided in a cholesteric guest-host liquid crystal composition having a positive dielectric anisotropy and a positive nematic host component which includes a new guest component comprising a tetra-azo dye having the following general chemical formula,

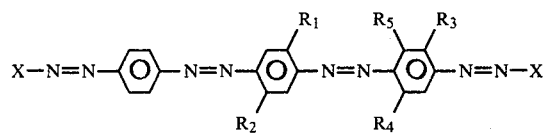

wherein X =

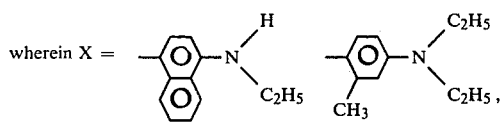

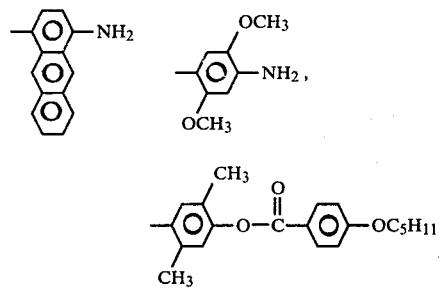

$R_1$ = —$OCH_3$, H
$R_2$ = —$CH_3$, H
$R_3$ = —$OCH_3$, H
$R_4$ = —$CH_3$, H
$R_5$ = —$CH_3$, H

The tetra-azo dye guest component of this invention is characterized by a dichroic ratio of greater than 0.72 and an absorption maximum in the range of 350 nanometers to 700 nanometers (1 nanometer = $1 \times 10^{-9}$ meters).

In operation the liquid crystal display system involves a phase change from the cholesteric state, in which the dye absorbs light, to the nematic state, in which the incident light is not absorbed thereby allowing it to pass through the liquid crystal layer. The dyes used in the present invention have the ability to absorb a large range of colors, i.e., of a wavelength of from 350 to 700 nm., giving the liquid crystal layer the capability of operating as a light valve. Thus when an orienting external force field such as an electric field is applied to the display system, the dye-containing liquid crystal becomes transmitting, showing the color (or colors) of the reflecting backing.

By means of the present invention the viewing angle is significantly increased as well as brightness and readability of the display.

For a better understanding of the present invention, together with other and further objects, reference is made to the following description, taken in conjunction with the accompanying examples, and its cope will be pointed out in the appended claims.

DETAILED DESCRIPTION OF THE INVENTION

Figure 1:
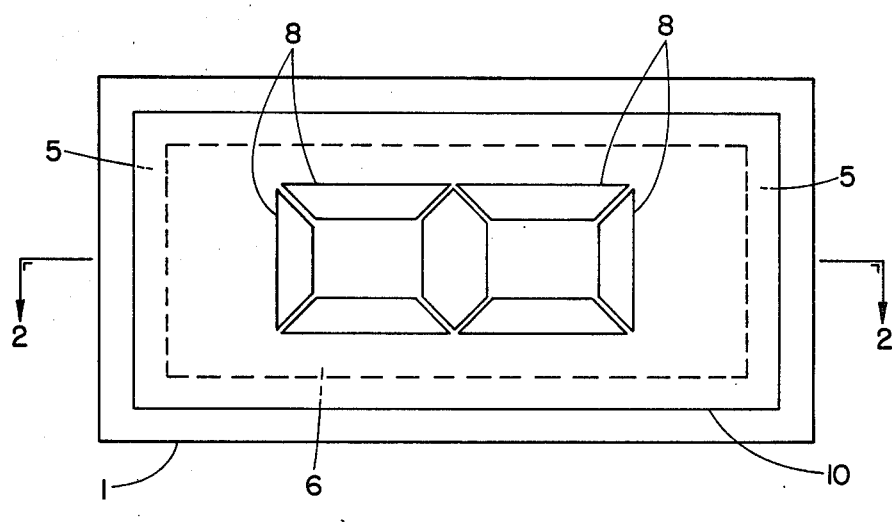
FIG. 1 is a plan view of an electronic display device of the present invention.
Figure 2:
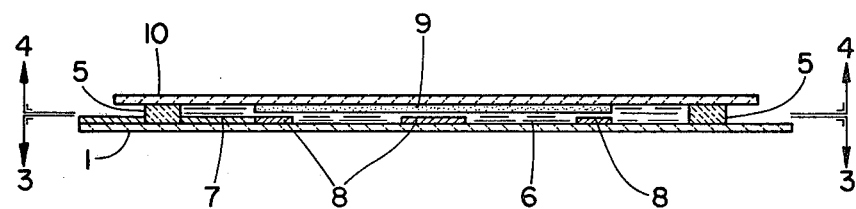
FIG. 2 is an exploded side elevation of the device shown in FIG. 1 is taken along section line 2—2.
Figure 3:
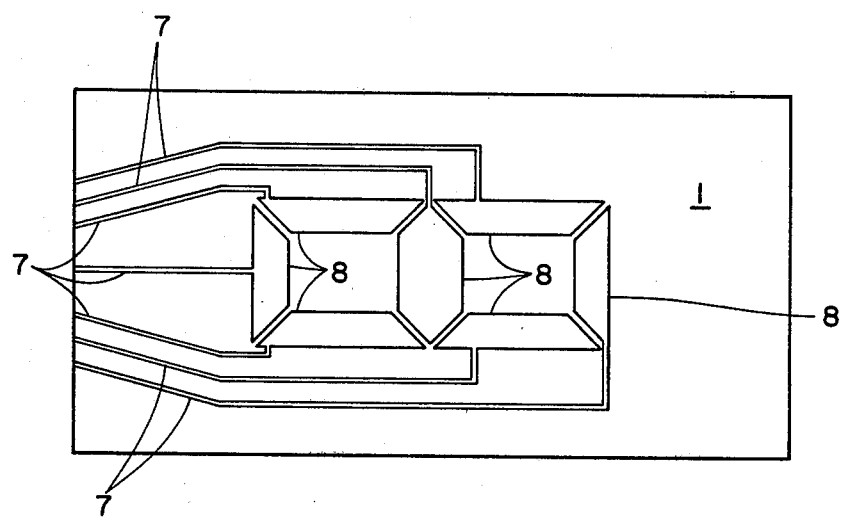
FIG. 3 is a view of the substrate 1 viewed in the direction indicated by section line 3—3.
Figure 4:
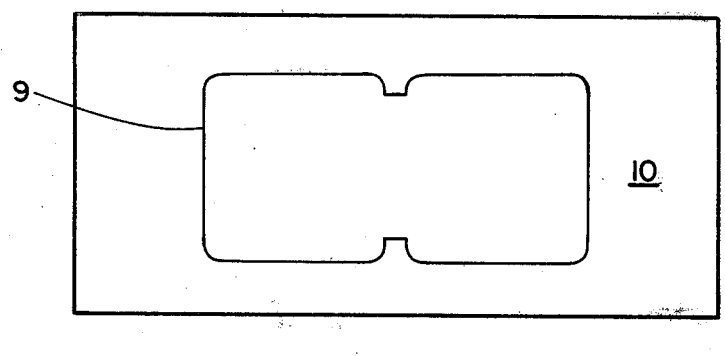
FIG. 4 is a view of the substrate 10 viewed in the direction indicated by section line 4—4.

A plurality of dichroic liquid crystal mixtures were prepared comprising at least one of a plurality of dichroic dyes of the tetra-azo class.

EXAMPLE 1

A first tetra-azo dye was synthesized as follows: 4-[[4-[[(4-aminophenyl)]azo]-2-methoxy-5-methyl-phenyl-]azo]-2-methoxy-5-methyl benzene amine,

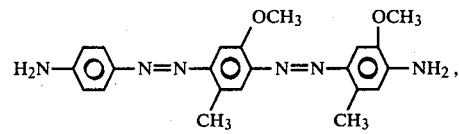

8.08 gm (0.02 M) was dissolved in 75 ml. water and 15 ml. hydrochloric acid and the mixture cooled to 0° to 5° C. while stirring. Then 3 g of sodium nitrite in 8 ml. of water were added slowly while the temperature was kept below 5° C. The tetrazotization proceeded smoothly and the reaction seemed to be complete after 1 hour. Urea (5 g) was then added to decompose excess nitrate and the mixture kept at 0° to 5° C. for an additional 1 hour. After checking to make certain that excess nitrite was destroyed, the tetrazonium solution was slowly added to a solution of 6.84 gm (0.04 M)1-N-ethylaminonaphthalene,

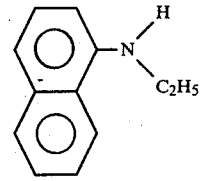

in 75 ml. of acetic acid which has been cooled to 0° C. The product was then slowly neutralized with potassium carbonate, filtered, and washed several times with distilled water. The precipitate was then further dried overnight in vacuum and recrystalized from pyridine. The resulting compound is: 4-[4-[4-[4-N-Ethylamino naphthyl azo]-phenyl azo]-2-methoxy-5-methyl phenyl azo]-2-methoxy-5-methyl phenyl azo]-N-Ethyl-1-naphthylamine,

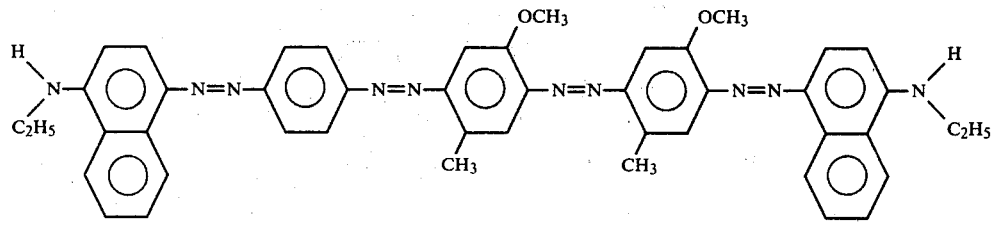

EXAMPLE 2

A second preferred tetra-azo for use in Dichroic liquid crystal composition was prepared in the same manner as above except that 1-amino anthracene was used as the coupling agent. The result is the dichroic dye 4-[4-[4-[4-[4-amino anthryl azo]-Phenyl azo]-2-methoxy-5-methyl phenyl azo]-2-methoxy-5-methyl phenyl azo]-anthryl amine having the formula

EXAMPLE 4

A fourth tetra-azo dye for use in Dichroic liquid crystal composition, synthesized by tetrazotizing 4-[[4-[[(4-aminophenyl]azo]-2-methoxy-5-methylphenyl-]azo]-3 methylbenzeneamine and coupling with 1-N-ethylaminonaphthalene, is 4-[4-[4-[4-[4-N-Ethylaminonaphthyl azo]-Phenyl azo]-2-methoxy-5-methylphenyl azo]-3-methyl phenyl azo]-N-Ethyl-1-

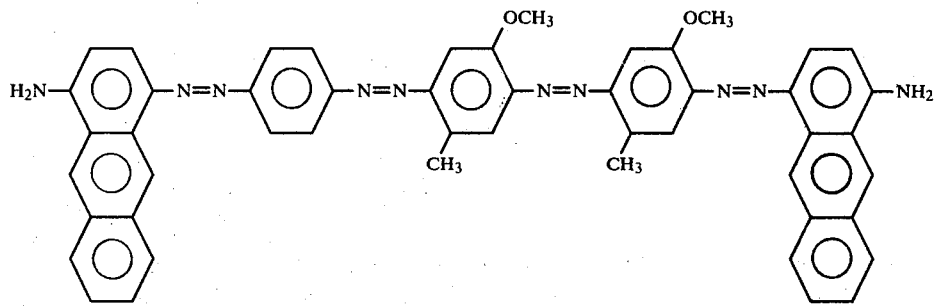

naphthylamine.

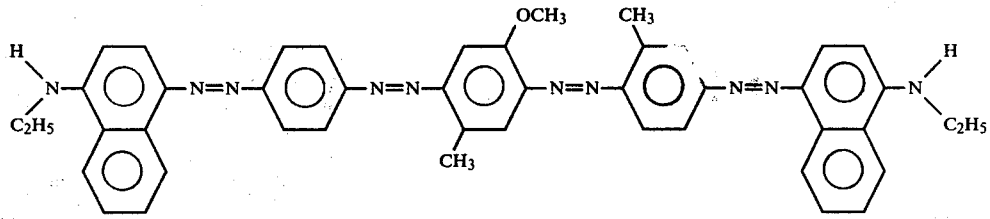

EXAMPLE 3

A third prefered tetra-azo dye for use in a Dichroic liquid crystal composition, produced as before by coupling 2,5 dimethoxy aniline, is 4-[4-[4-[4-[(4-amino-2,5 dimethoxy phenyl)-azo]-Phenyl azo]-2-methoxy-5-methyl phenyl azo]-2-methoxy-5-methyl phenyl azo]-2, 5 dimethoxy benzene amine

EXAMPLE 5

The present invention also includes new tetra-azo ester prepared by dissolving 6.7 g (0.01 M) of 4-[4-[4-[4-[(4-hydroxy-2,5 dimethyl phenyl azo]-phenyl azo]-2-methoxy-5-methyl phenyl azo]-2-methoxy-5-methyl phenyl azo]-2,5 dimethyl phenol

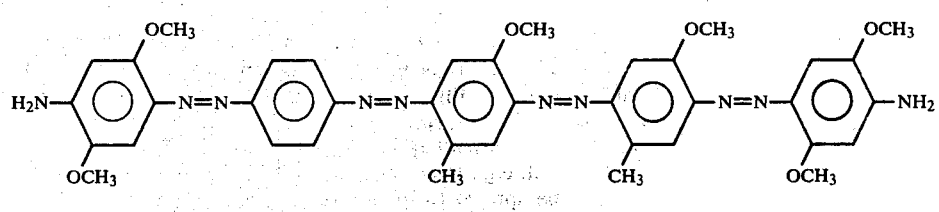

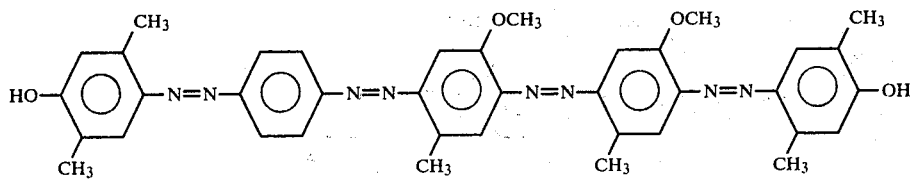

in about 100 ml. of Pyridine. To this solution was added 4.52 gm (0.02 M) of p-Pentyloxy benzoylchloride,

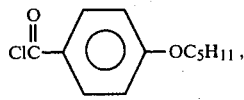

in 25 ml of benzene. The reaction mixture was refluxed for an extended period of time after which the benzene and pyridine were distilled off. The product shown below was recrystallized from the pyridine.

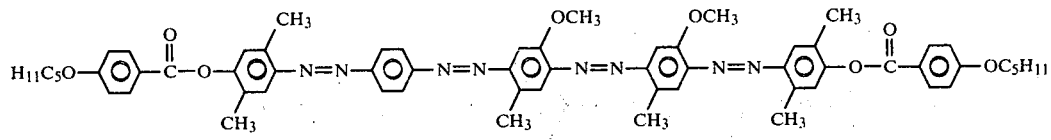

Each of the above compounds were tested by dissolving approximately 0.5% by weight of dye in a host nematic liquid crystal composed of 90% EM 1221, a six component phenylcyclohexane mixture sold by E. Merck Chemical Co., which includes phenylcyclohexanes, biphenylcyclo hexanes, and esters thereof, and 10% of BDH T-15, a terphenyl chemical sold by British Drug House Chemical Co., which includes essentially parapentylcyanoterphenyl.

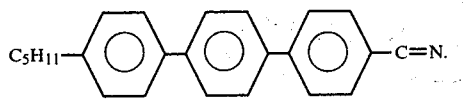

The nematic mesomorphic range of the compounds was found to be −20° C. to +85° C.

A test cell was constructed utilizing Indium/TinOxide-coated glass. Substrates were employed having surfaces coated with obliquely evaporated silicon oxide orientation layers, utilizing an angle of 60° with respect to the substrate normal surface. The orientation layer provided unidirectional alignment of the molecules of the Dichroic dye parallel to the substrate planes. A 12 micron thick layer of the liquid crystal host dye mixture was sealed between the substrates and the order parameter was calculated from the measurement of light absorption with a polarizer respectively parallel and perpendicular to the nematic liquid crystal director.

Tests performed using the dyes prepared in the examples above yielded the results shown in the Table following which reveal very high order parameter. This consistent surprisingly high level of performance compares advantageously with the performance of tris- and penta-azos known heretofore in the art of dichroic dyes.

| TEST RESULTS | | | |
|---|---|---|---|
| Dye | $S = (R-1)/(R+2)$ | Maximum Wavelength Absorption | Color |
| Example #1 | 0.76 | 600 nm | Blue |
| Example #2 | 0.75 | 602 nm | Greenish Blue |
| Example #3 | 0.76 | 580 nm | Purple |
| Example #4 | 0.77 | 596 nm | Blue |
| Example #5 | 0.77 | 465 nm | Orange-Yellow |

Further tests were conducted on the test cells after exposure to prolonged ambient light conditions approximating sunlight. Specifically, each display cell was positioned so that the sunlight source (Xenon lamp) was perpendicular to the front surface of the cell to approximate the sun's spectrum with color temperature of 6774° Kelvin. After exposure to 1000 hours of noon sun the dye compound of the present invention remained stable under operating conditions of 30 volts AC and a temperature of 100° C.

The dye of Example No. 1 results in a blue liquid crystal mixture when prepared in accordance with the formulation below 0.9 g of EM 1221,
0.1 g of BDH T-15
0.05 g of CB-15 (a cholesteric, biphenyl sold by British Drug House), and
0.006 g blue tetra-azo dye of Example #1

Black liquid crystal mixture may be prepard in accordance with the formulation below:

0.9 g of EM 1221,
0.1 g of BDH T-15,
0.05 g of CB-15,
0.009 g tetra-azo dye of Example #1, and
0.006 g tetra-azo ester dye of Example #5

An electronic display device prepared in accordance with the present invention is shown in the accompanying drawings. Referring to the drawings a display device is depicted as having two substrates, 1 and 2, such as glass, at least one of which must be transparent so as to permit passage of light. Preferably both substrates are transparent.

Substrates 1 and 10 are joined together at their perimeters by adhesive layer 5 thereby forming a thin layer 6 which is filled with the dichroic dye disclosed herein.

The interior side of each substrate is selectively coated with transparent electrically conductive material, e.g., indium oxide, so that an electric impulse may be applied to the interior of the display device. In the Figures the electrically conductive material on substrate 1 is shown as two components, i.e., electrical leads 7 and symbol-forming patterns 8. Electrical leads 7, provide a means for conducting an electric current to the figure-forming patterns 8. Figure-forming patterns 8 form one electrode which, along with electrically conductive-coating 9 on substrate 10, form two electrodes which allow the current to pass through and activate the thin layer of dichroic dye composition 6 contained therebetween.

The ability of the novel dichroic dyes of the present invention to produce high brightness displays having good clarity makes them ideal for use in portable instruments, automotive instrument panels, avionic instrument panels and, in general, in those circumstances in which the display system is intended for use in high ambient light conditions. In use, degradation normally caused by the combined effect of temperature, humidity, vibration, etc. is to a great extent overcome by employing the present invention. Consequently, microprocessors capable of instantly computing useful information from several input parameters may be used in conjunction with display devices incorporating tetra-azo dichroic dyes to provide the user with helpful performance data at a moments notice, especially since liquid crystal displays characteristically have very low power requirements. To the extent that the present invention may be used in automobile instrument panels, an article by Derick Jones and Bhupendrarai Desai, entitled "The Performance of Dicrhroic Displays for Automotive Instrument Panel Use," SAE Technical Paper Series 800360, published by the Society of Automotive Engineers, Inc., 1980, describes necessary and ideal performance criteria, and is incorporated herein by reference.

I claim:

1. A cholesteric guest-host liquid crystal composition having a positive dielectric anisotropy comprising a phenylcyclohexane-containing positive nematic host component, an optically active cholesteric component, and a tetra-azo dichroic dye guest component capable of fully dissolving in said host component at concentration levels associated with dyes having fewer azo groups and having a dichroic ratio of at least 0.72, said tetra-azo dye selected from the group consisting of

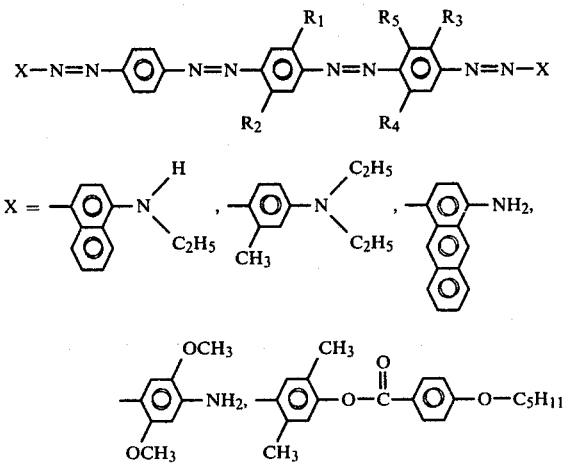

$R_1 = -OCH_3, H$
$R_2 = -CH_3, H$
$R_3 = -OCH_3, H$
$R_4 = -CH_3, H$
$R_5 = -CH_3, H$

2. The tetra-azo dye composition of claim 1 which is stable under operating conditions of 30 volts AC, and a temperature of 100° C., and after exposure to 1000 hours of noon sun.

3. The composition of claim 2 which has an absorption maximum in the range of from about 350 nanometers to about 700 nanometers.

4. The composition of claim 1 wherein said dye is 4-[4-[4-[-4[4-N-Ethylamino naphthyl azo]-phenyl azo]-2-methoxy-5-methyl phenyl azo]-2-methoxy-5-methyl phenyl azo]-N-Ethyl-1-naphthylamine, having the following chemical formula:

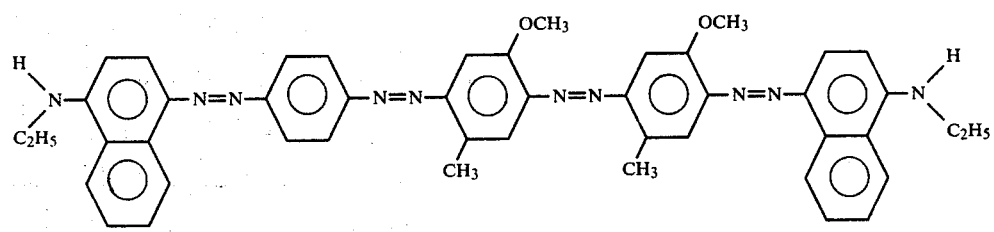

5. The composition of claim 1 wherein said dye has the following chemical formula:

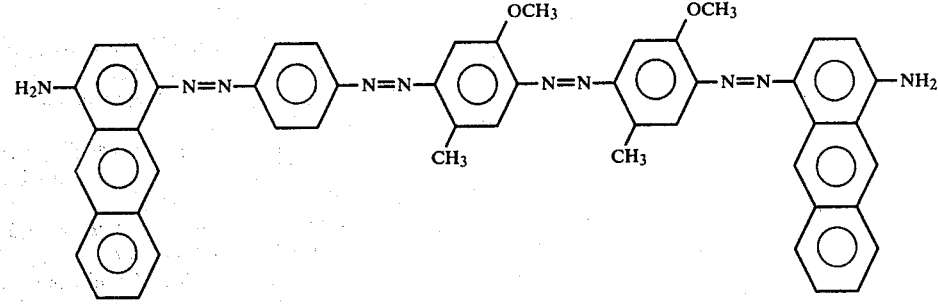

6. The composition of claim 1 wherein said dye has the following chemical formula:

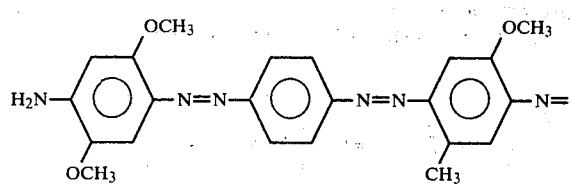

7. The composition of claim 1 wherein said dye has the following chemical formula:

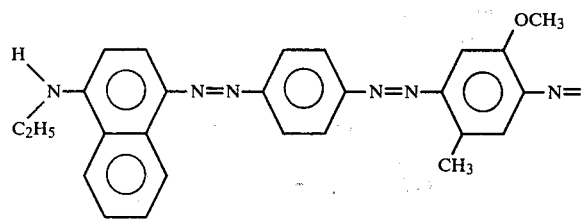

8. The composition of claim 1 wherein said dye has the following chemical formula:

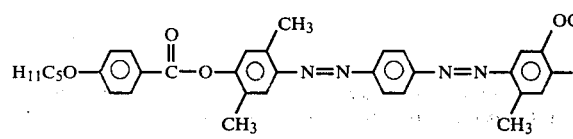

9. The liquid crystal composition of claim 1 wherein the dye having the following chemical formula:

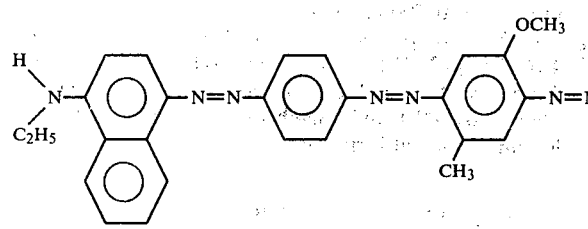

and the dye having the following chemical formula:

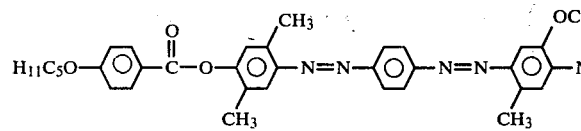

are included in a ratio of 0.15:1.

10. An electronic display device for use in an electronic display system which operates by use of selectively applied electrical impulses comprising:
   a first and a second substrate, at least one of said substrates being transparent,
   a layer of transparent electrically conductive material applied to one side of each of said substrates,
   a cholesteric guest-host liquid crystal composition as described in claim 1 and
   means for applying electrical impulses to said electrically conductive coatings, said substrates arranged immediately adjacent each other so that the perimeters thereof are essentially congruent and the sides having said electrically conductive layers are facing each other with a thin layer of said cholesteric guest-host liquid crystal composition located therebetween, and sealed together at the perimeter thereof to retain said liquid crystal composition therein, and said means for applying electrical impulses arranged on the combined substrates conveniently for connection to a source of electrical impulses.

11. An electronic display device as in claim 10 wherein said substrates are sheets of glass.

12. An electronic display device as claim 10 or 11 wherein said electrically-conductive layer comprises Indium Oxide.

13. An electronic display device as in claim 10 or 11 wherein said means for applying electrical impulses are electrically conductive wire leads.

14. An electronic display device as in claim 10 or 11 wherein said liquid crystal layer has a thickness of from about 7 to about 20 microns.

15. The composition of claim 1 wherein said positive nematic host component comprises a mixture of phenyl-cyclohexanes and a terphenyl-containing portion.

16. The composition of claim 15 wherein said terphenyl-containing portion includes para-pentylcyanoterphenyl.

17. The composition of claim 15 wherein said phenylcyclohexane mixture is present in said positive nematic host component in an amount of about 90% and said terphenyl-containing portion is present in said host component in an amount of about 10%.

18. The composition of claim 15 wherein said tetraazo dichroic dye component is present in an amount of at least about 0.5% by weight.

19. The composition of claim 1 wherein said order parameter is at least about 0.75.

* * * * *